Dec. 17, 1968 A. SABATINO 3,416,970
METHOD OF ASSEMBLING BATTERY CASINGS
Filed Jan. 24, 1964 2 Sheets-Sheet 1
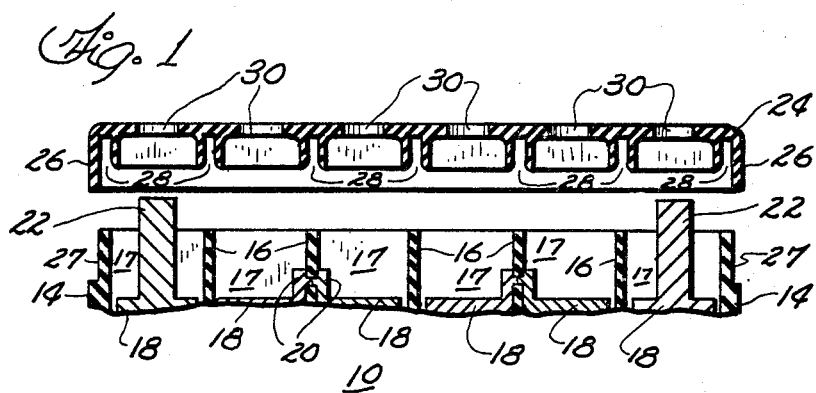
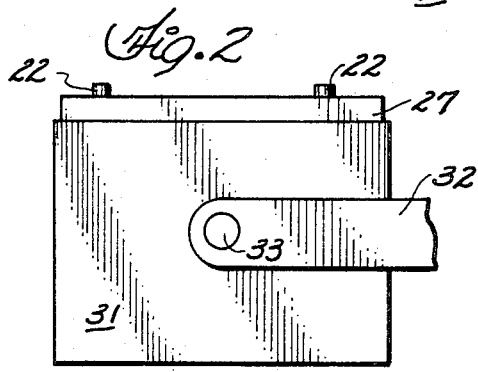
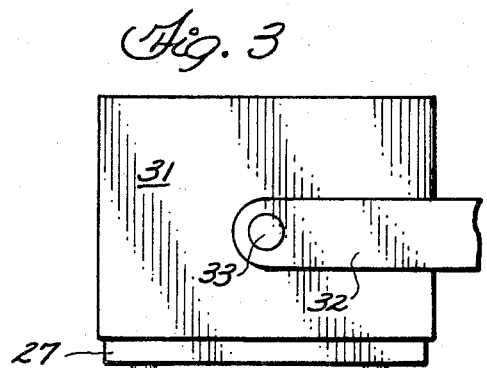
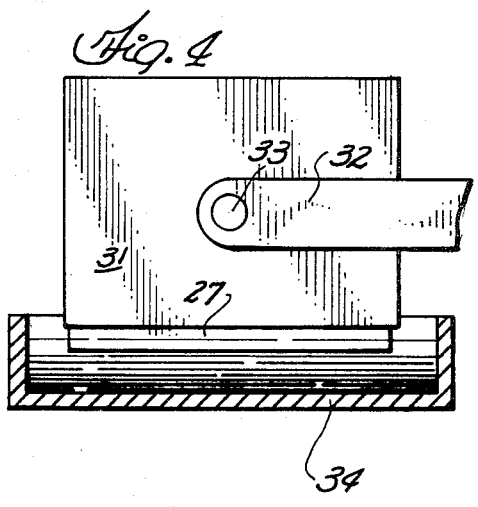
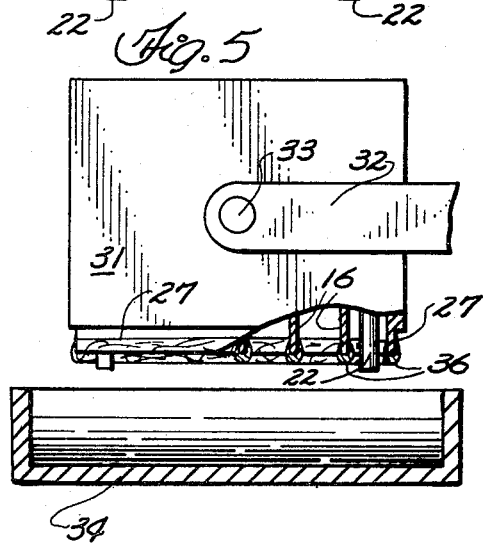
INVENTOR.
Anthony Sabatino
BY Pendleton, Neuman,
Seibold & Williams
Atty's Dec. 17, 1968 A. SABATINO 3,416,970
METHOD OF ASSEMBLING BATTERY CASINGS
Filed Jan. 24, 1964 2 Sheets-Sheet 2
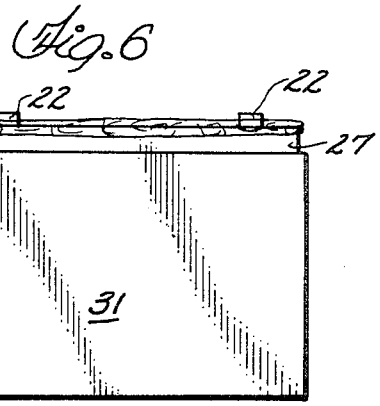
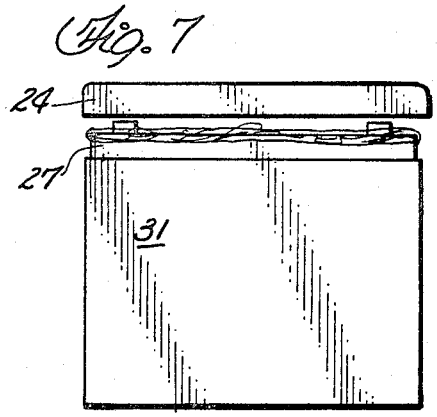
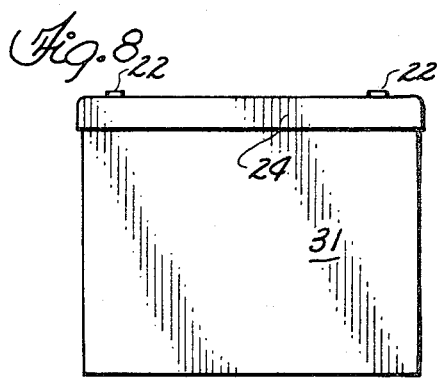
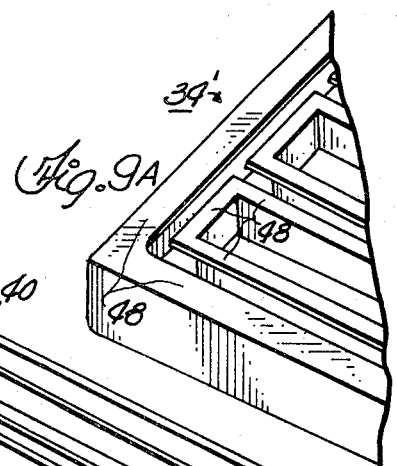
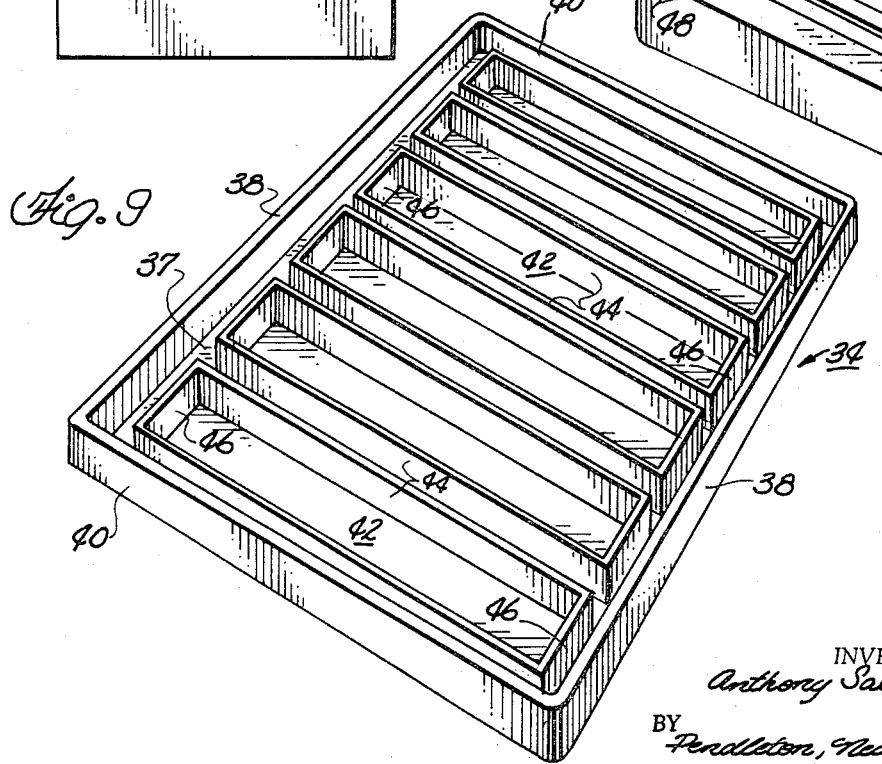
INVENTOR.
Anthony Sabatino
BY
Pendleton, Neuman,
Seibold & Williams
Attorneys

United States Patent Office 3,416,970
Patented Dec. 17, 1968

1

3,416,970
METHOD OF ASSEMBLING
BATTERY CASINGS
Anthony Sabatino, Milwaukee, Wis., assignor to Globe-Union Inc., Milwaukee, Wis., a corporation of Delaware
Filed Jan. 24, 1964, Ser. No. 339,962
5 Claims. (Cl. 136—176)

This invention relates to electric storage batteries, and more particularly to the manner of fabrication of the casings of such batteries.

In the assembly of a storage battery, it is common to assemble its various elements within an open-topped casing having a number of interior walls for separating adjacent cells of the battery. When the elements are thus assembled within the casing, a one-piece cover is placed over the open side of the casing and cemented thereto to form the completed battery casing. The cover is generally provided with grooves adapted to receive the projecting edges of the side and end walls of the container, and also of the interior walls, and cement is placed within these grooves prior to placing the cover in position over the casing, thereby to seal the casing and its cover together in fluid-tight relationship.

As the pattern of the grooves in the cover is relatively complex and extensive, the step of manually placing the cement in the grooves is costly and time consuming. Furthermore, the step of filling the grooves with cement prior to placing the cover in position over the container does not readily lend itself to automation, so that the cost of such a battery cannot easily be reduced by automating the step of placing cement in the grooves of the cover in order to eliminate the need for manual execution of this step. The present invention overcomes these disadvantages by providing a process for assembling battery casings which may readily be automated.

Accordingly, it is a principal object of the present invention to provide an improved method for assembling the components of a battery casing.

Another object of the present invention is to provide such a method which readily lends itself to automation.

A further object of the present invention is to provide such a method which results in joints of increased uniformity by the even application of cement to form such joints.

These and other objects and advantages of the invention will become manifest upon examination of this specification and the accompanying claims and drawings.

In one embodiment of the present invention there is provided a method of assembling a battery casing comprising applying an even coating of cement to the free edges of the walls of the casing, and then placing a battery cover in fitting engagement with said edges, thereby to form a sealed battery casing.

Reference will now be made to the accompanying drawings in which:

FIG. 1 is a vertical cross-sectional view of a storage battery casing and cover in spaced-apart relation, with which the process of the present invention may be performed;

FIGS. 2 to 8 are diagrammatic illustrations of successive steps in the process of the present invention;

FIG. 9 is a perspective view of a dipping tank employed in the performance of the present invention; and FIG. 9A is a perspective view of a portion of an alternative dipping tank.

Referring now to FIG. 1, there is illustrated a storage battery in cross section having a casing 10 defined by

2 end walls 14, and a plurality of interior walls 16. The end walls 14 and the interior walls 16 are preferably formed in a one-piece construction including an integral bottom wall and side walls (not shown). The interior walls 16 are spaced apart in parallel relation to the end walls 14 and define a plurality of cells 17 each of which houses an electrode assembly 18. The electrode assemblies 18 are interconnected by means of connecting legs 20 which extend through apertures located in the interior walls 16. The electrode assemblies 18 in the endmost cells are each provided with an electrode post 22 which extends upwardly and is adapted to be connected externally of the battery to a load which the battery is intended to power in operation. A cover member 24 is adapted to be disposed in nesting relationship with the upper ends of the end walls 14 and the interior walls 16 and the side walls (not shown) and is provided with a pair of end walls 26 which nest in a recess 27 provided in each of the end walls 14 of the casing. It will be understood that the side walls of the casing are provided with similar recesses which receive downwardly extending side walls (not shown) of the cover member. The cover member 24 is also provided with a plurality of grooves 28 each to receive the free end of one of the upwardly extending end walls 14, interior walls 16 and side walls. Each of the upwardly extending walls of the casing 10 is adapted to be cemented in its respective groove, such that the casing and cover are maintained in sealing engagement to prevent electrolyte from communicating between any of the cells of the battery. The cover 24 is provided with a plurality of openings 30 through which additional water may be added to the various cells from time to time. The openings 30 may conveniently be closed with threaded caps which may easily be removed for inspection of the level of electrolyte within the various cells.

Referring now to FIGS. 2 through 8, various steps in the performance of the process are diagrammatically illustrated. In FIG. 2, a battery casing 31, which may be carried by a moving conveyor belt or the like (not shown) is aligned and securely gripped by a clamping mechanism, diagrammatically illustrated at 32, having a pivot axis 33, by which the battery may be caused to assume an inverted position as illustrated in FIG. 3. The casing 31, while inverted, is lowered partially into a tank 34 (FIG. 4) of cement such that the edges of the end walls 14, the interior walls 16 and the side walls are dipped below the surface of the liquid cement within the tank 34. The physical characteristics of the cement are controlled in a manner hereinafter to be described, to enable the edges of the walls 14 and 16 to pick up a sufficient quantity of the cement to effect a sealing between the casing 10 and the cover member 24.

The tank 34 is preferably provided with float-controlled means or the like (not shown) for automatically adding more cement to the tank 34 to maintain a constant level of cement therein. Pick up of the cement is illustrated in FIG. 5, which shows a blob of cement 36 clinging to the edge of each of the walls 14 and 16 as the casing 10 is lifted out of contact with the cement.

The casing is then preferably turned right side up as illustrated in FIG. 6 and the cover 24 applied thereto by bringing the same into nesting engagement with the free ends of the walls of the casing 10, as illustrated in FIG. 7. Alternatively, the cover and the casing may be assembled while the latter is inverted, but provision must then be made for the electrode posts 22 which project through the cover. The cement 36 fills the spaces between the free ends of the walls of the casing 10, and the extending grooves 28 of the cover 24. After the battery is assembled as illustrated in FIG. 8, its temperature is controlled during curing of the cement, after which there is a firm bond between the casing 10 and the cover member 24.

Referring now to FIG. 9, the tank 34 is illustrated in perspective. The tank 34 comprises a rectangular boxshaped compartment having a bottom wall 37, closed side walls 38 and end walls 40, and a plurality of upstanding rectangular-shaped dams 42 having closed side walls 44 and end walls 46 secured to the bottom wall 37. The dams 42 each provide a recess extending below the level of the cement contained between the exterior walls 38 and 40 and the dams 42, through which the electrode assemblies 18 of the battery may protrude while the walls of the casing 10 are dipped into the cement. The terminal posts 22 also protrude through the recesses and do not engage the cement, which otherwise would interfere with their electrical connection to outside terminal posts during a later stage of assembly of the battery. The tank 34 may have one-piece construction, so that all of the various walls are integral with each other, or may alternatively be constructed by assembling of a number of parts. The bottom wall 37 may be continuous within the area bounded by the side walls 38 and end walls 40, but is preferably provided with apertures having edges coextensive with the lower edges of the dam walls 44 and 46, so that the electrode assemblies may be passed completely through the recesses when the walls of the casing 10 are dipped.

In accordance with the process of the invention, the cement contained within the tank 34 is preferably composed of an epoxy type resin which may be cured by the application of heat after the cover member 24 is placed in position, or alternatively by preheating the cover member 24, the casing 10, or both, prior to the dipping of the casing. The heat contained in the preheated elements is sufficient to perform the curing process. Alternatively, a combination of preheating and post-dip heating may also be employed to cure the resin cement. The epoxy resin within the tank 34 preferably contains a thickening agents such as "Bentone" or Cab-O-Sil, which forms a fine colloidal dispersion with the resin and reduces its tendency to slide from the casing walls after it has been picked up, thus increasing its viscosity. The viscosity of the resin is thus regulated to produce a viscosity of approximately 1,000 to 10,000 centipoise, with 3,000 centipoise being preferred.

The casing 10 and the cover 24 may be composed of any material customarily used for battery casings such as rubber, rubber composition, or a thermoplastic material, or other comparable materials well known to those skilled in the art.

The time of dipping of the casing 10 into the cement is not critical. The mechanical characteristics of the cement are controlled by adding thickeners to permit the walls 14 and 16 of the casing to pick up a thickness of about 0.01″ to 0.04″ of cement. The depth of penetration of the free ends of the casing walls into the cement is preferably between ⅛″ and ½″, when the depth of the grooves 28 of the cover 24 is about ⅞″, to permit the casing walls to pick up the sufficient quantity of cement to completely fill the grooves 28 on assembly of the casing 10 and cover 24 together. During the assembly, excess cement picked up by the edges of the walls 14 to 16 runs down a short distance on the walls 14 and 16 to completely fill the space between the walls 14 and 16 and the grooves 28. The amount of cement picked up, however, is not so much as to allow the cement to run down the walls into the electrolyte or to interfere with the electrode assemblies.

The required duration of the curing step illustrated in FIG. 8 of the drawings depends upon the temperature of the battery. Thermosetting epoxy cures in about five hours at 70° F., and between five and thirty minutes, at 120° F. to 200° F. It is preferable to perform this step at room temperature, so that a curing oven is not required. The curing time may be shortened if either the casing 10 or the cover 24 is preheated prior to dipping the same into the resin.

Another alternative process is to employ a stripper mechanism for striping excess cement adhering to the walls 14 and 16 upon their removal thereof from the tank 34 after picking up a quantity of cement. This may be accomplished by employing the tank 34′ of FIG. 9A instead of the tank 34 illustrated in FIG. 9. Parts in FIG. 9A which correspond to parts in FIG. 9 have been indicated by common reference numerals.

As shown in FIG. 9A, the dip tank 34′ has been modified by providing horizontally extending flanges 48 on the free edges of all of the vertical walls of the tank, which flanges extend over the cement-holding portions of the tank. The flanges are all disposed in the same horizontal plane, and have their free ends spaced apart from each other by a predetermined distance. The free ends of the flanges operate to "strip off" any excess thickness of cement picked up by the edges of the casing walls, as the casing is withdrawn from the tank after dipping. With the tank of FIG. 9A, less attention need be given to the physical characteristics of the cement, since the thickness of the cement picked up is substantially the same irrespective of these characteristics, as long as the cement is sufficiently viscous and adherent to build up at least the thickness of the layer desired. It is necessary, however, to register the casing 10 fairly well with the tank before the casing 10 is raised out of the tank, to ensure that each side of each wall has approximately the same thickness of cement after the stripping step.

It will be evident from the above that the method of the present invention can very easily be automated, resulting in substantial savings in production costs of batteries. Moreover, the coating of cement is rendered more even by the present invention, resulting in more uniform joints between the casing and the cover member.

From the above, the present invention is so completely and fully described as to enable others skilled in the art, by applying current knowledge, to adapt the same for use under varying conditions of service, without departing from the essential features of novelty involved, which are intended to be defined and secured by the appending claims.

What is claimed is:

1. A method of assembling a battery casing including a cover and an open top casing body having a plurality of vertical walls and containing a plurality of electrode assemblies having terminal members designed to extend outwardly from said casing body beyond said cover, comprising the steps of positioning the casing body in an inverted position, lowering said casing body into a supply of cement to wet the free edges of said walls with cement while maintaining said terminal members out of contact with said cement, withdrawing said casing body from said cement, and placing said cover in fitting engagement with said edges.

2. The method according to claim 1, including the step of heating said assembled casing to cure said cement.

3. The method according to claim 1, wherein said cement comprises an epoxy resin, and including the step of controlling the physical properties of such resin by selectively adding thickening agents.

4. The method according to claim 1, including the step of heating a portion of said assembled casing prior to assembly.

5. The method according to claim 1, wherein a layer of said cement adheres to said walls as said casing is withdrawn from said cement, and including the step of stripping off excess cement to confine said layer to a predetermined thickness.

(References on following page)

References Cited

UNITED STATES PATENTS

| | | | |
|---|---|---|---|
| 702,135 | 6/1902 | Henderson | 118—429 |
| 1,784,216 | 12/1930 | Aldrich et al. | 136—170 |
| 2,415,906 | 2/1947 | Paige | 156—69 X |
| 2,454,286 | 11/1948 | Lerner | 118—429 |
| 2,890,262 | 6/1959 | Kendall et al. | 136—170 |
| 2,942,055 | 6/1960 | Doyle et al. | 136—170 X |

WINSTON A. DOUGLAS, *Primary Examiner.*

D. L. WALTON, *Assistant Examiner.*

U.S. Cl. X.R.

136—170